United States Patent [19]

Harney

[11] Patent Number: 5,682,208
[45] Date of Patent: Oct. 28, 1997

[54] MOTION ESTIMATION WITH EFFICIENT BLOCK MATCHING

[75] Inventor: Kevin Harney, Brooklyn, N.Y.

[73] Assignee: Intel Corporation, Santa Clara, Calif.

[21] Appl. No.: 332,828

[22] Filed: Oct. 31, 1994

[51] Int. Cl.⁶ ........................................... H04N 7/36
[52] U.S. Cl. .................. 348/699; 348/416; 382/236
[58] Field of Search ................................ 348/402, 407,
348/409, 412, 413, 416, 699, 719; 364/514 R,
514 A, 715.02; 382/232, 236; H04N 7/137

[56] References Cited

U.S. PATENT DOCUMENTS

| | | | |
|---|---|---|---|
| 4,897,720 | 1/1990 | Wu et al. | 348/412 |
| 5,398,068 | 3/1995 | Liu et al. | 348/416 |
| 5,448,310 | 9/1995 | Kopet et al. | 348/699 |
| 5,473,379 | 12/1995 | Horne | 348/416 |
| 5,475,446 | 12/1995 | Yamada et al. | 348/699 |
| 5,486,876 | 1/1996 | Lew et al. | 348/719 |
| 5,526,295 | 6/1996 | Astle | 364/715.02 |

*Primary Examiner*—Hassan Kizou
*Attorney, Agent, or Firm*—William H. Murray; N. Stephan Kinsella

[57] ABSTRACT

A computer-implemented method for encoding image signals. According to a preferred embodiment of the invention, a plurality of search blocks is selected in accordance with the location of a reference block of a current frame. A plurality of words corresponding to the plurality of search blocks is read from a memory device. A difference measurement for each search block of the plurality of search blocks with respect to the reference block is determined from the plurality of words and from the reference block.

45 Claims, 8 Drawing Sheets

FIGURE 1. ENCODING SYSTEM

FIGURE 2. DECODING SYSTEM

| WORD ADDRESS | byte 03 | byte 02 | byte 01 | byte 00 | |
|---|---|---|---|---|---|
| 0x00 | pixel 0,3 | pixel 0,2 | pixel 0,1 | pixel 0,0 | \ 1st Row of |
| 0x01 | pixel 0,7 | pixel 0,6 | pixel 0,5 | pixel 0,4 | / block 0,0 |
| 0x02 | pixel 0,3 | pixel 0,2 | pixel 0,1 | pixel 0,0 | \ 1st Row of |
| 0x03 | pixel 0,7 | pixel 0,6 | pixel 0,5 | pixel 0,4 | / block 0,1 |
| . | . | . | . | . | |
| 0x2N | pixel 0,3 | pixel 0,2 | pixel 0,1 | pixel 0,0 | \ 1st Row of |
| 0x2N+1 | pixel 0,7 | pixel 0,6 | pixel 0,5 | pixel 0,4 | / block 0,N |
| 0x2N+2 | pixel 1,3 | pixel 1,2 | pixel 1,1 | pixel 1,0 | \ 2nd Row of |
| 0x2N+3 | pixel 1,7 | pixel 1,6 | pixel 1,5 | pixel 1,4 | / block 0,0 |
| . | . | . | . | . | |
| 0x2N*M+(2N-1) | pixel 0,3 | pixel 0,2 | pixel 0,1 | pixel 0,0 | \ Last Row of |
| 0x(2N+1)+(2N) | pixel 0,7 | pixel 0,6 | pixel 0,5 | pixel 0,4 | / block M,N-1 |
| 0x(2N+2)*+2N+1 | pixel 1,3 | pixel 1,2 | pixel 1,1 | pixel 1,0 | \ Last Row of |
| 0x(2N+3)+(2N+2) | pixel 1,7 | pixel 1,6 | pixel 1,5 | pixel 1,4 | / block M,N |

MOTION ESTIMATION WITH EFFICIENT BLOCK MATCHING

BACKGROUND OF THE INVENTION

1. Field of the Invention

The present invention relates to signal processing and, in particular, to computer-implemented processes and apparatuses for motion estimation with efficient block matching.

2. Description of the Related Art

Motion estimation is commonly utilized by video encoders in signal processing techniques that compress successive frames of video data ("video frames"). For example, a plurality of video frames, each represented by a bitstream, may represent successive images of a motion video. When these video frames are to be transmitted via a communication medium of limited bandwidth, or are to be stored in a storage medium having limited storage capacity, it is often desirable to first compress the data contained in the bitstreams.

Motion estimation is one of the most computationally intense of the various techniques utilized to compress data. Motion estimation techniques exploit the temporal correlation that often exists between consecutive video frames, in which there is a tendency of some objects or image features to move within restricted boundaries from one location to another from frame to frame.

For instance, frame 1 may contain an object, and frame 2 may contain an identical set of pixels corresponding to the object spatially displaced by a few pixels from the location of the same set of pixels in frame 1. If frame 1 is transmitted to and received by a pixel processor or video processor (which performs any necessary decompression or other decoding), frame 2 may be transmitted without the pixels corresponding to the object. Instead, information such as motion vectors or pointers is sent along with frame 2 (which may also be compressed using other techniques). These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in Frame 2.

The motion estimation procedure may be performed at the encoder level by comparing given regions or blocks within a current video frame to many regions or blocks within the previous video frame. The process of comparing a given block of one frame to blocks of another frame to find a sufficiently similar match is often called "block matching." Blocks are matched by determining a "difference measurement" between any given pair of blocks. A difference measurement corresponds to the overall degree of difference of the two regions. If the difference measurement is below a predetermined threshold, the blocks are considered to be similar enough that a block match is indicated. If so, the block in the previous video frame may be utilized as described above by the video decoder to reproduce the same block in the current video frame.

In performing such comparisons, a large number of pixels from the previous video frame are accessed for each block of the current video frame that is subjected to motion estimation. In general purpose video processing systems, the bitmaps corresponding to the previous and current video frame pixels are stored in general purpose memory connected to the video processor through a bus. For each block matching procedure the video processor must access the memory many times, which may constitute a high amount of traffic on the bus and a high number of memory accesses. Because of the limited bandwidth of the bus by which the memory is accessed, these memory accesses can tie up use of the bus and memory and thus slow down overall operation of the video processing system.

To avoid this problem, the video processor performing the motion estimation step may contain, for example, a dedicated, special-purpose memory space to store the two video frames being compared so that there is less traffic on the bus. However, such a special-purpose memory space is often unavailable, unfeasible, or otherwise not desired because of the extra complexity of such a special-purpose memory. The special-purpose memory space may be too costly. Further, even a special purpose memory space may be accessed so often during block matching that the video processor may be slowed down.

It is accordingly an object of this invention to overcome the disadvantages and drawbacks of the known art and to provide a method and apparatus that more efficiently uses available data to perform block matching so that the bus is utilized more efficiently.

It is a further object of this invention to accelerate block matching operations utilized in motion estimation by more efficiently using available data to allow greater user flexibility in selecting a wider range of motion estimation techniques.

Further objects and advantages of this invention will become apparent from the detailed description of a preferred embodiment which follows.

SUMMARY

The previously mentioned objectives are fulfilled with the present invention. There is provided herein a computer-implemented method for encoding image signals. According to a preferred embodiment of the invention, a plurality of search blocks is selected in accordance with the location of a reference block of a current frame. A plurality of words corresponding to the plurality of search blocks is read from a memory device. A difference measurement for each search block of the plurality of search blocks with respect to the reference block is determined from the plurality of words and from the reference block.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
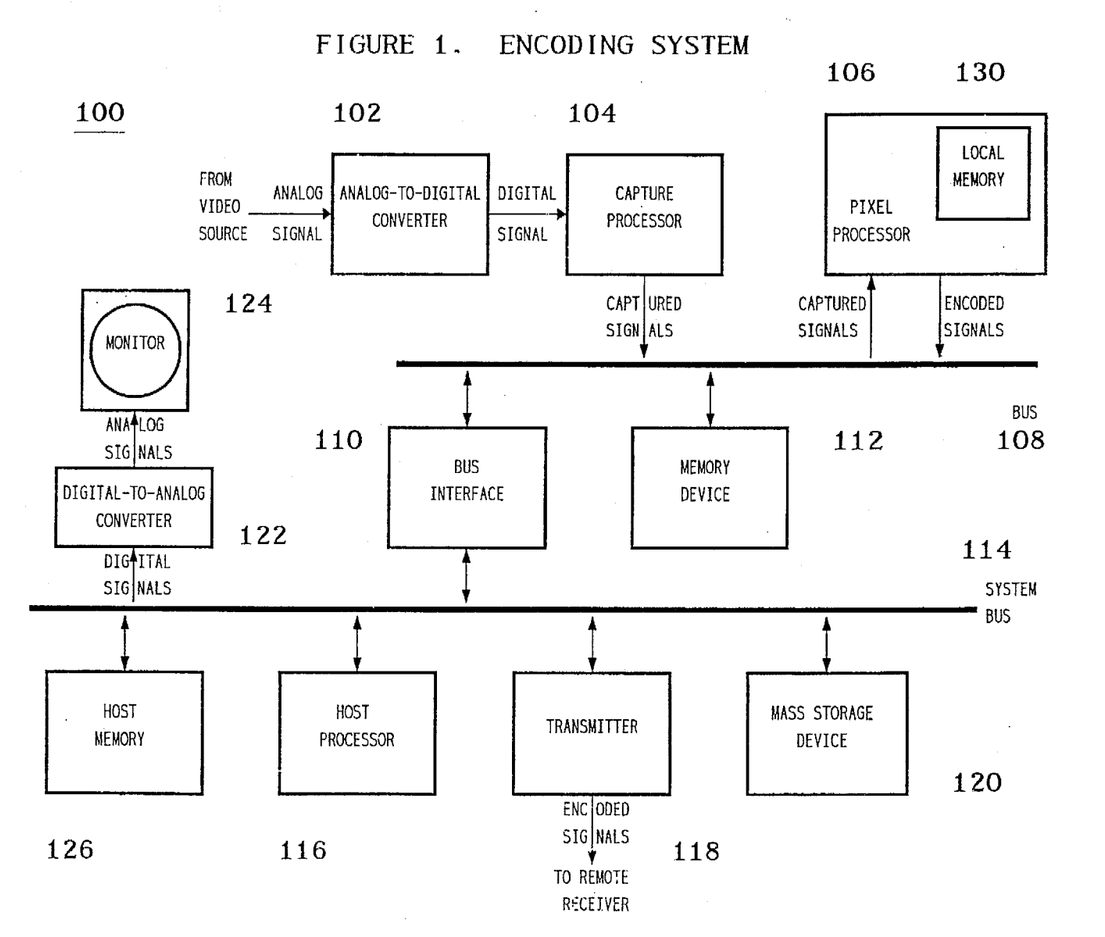
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
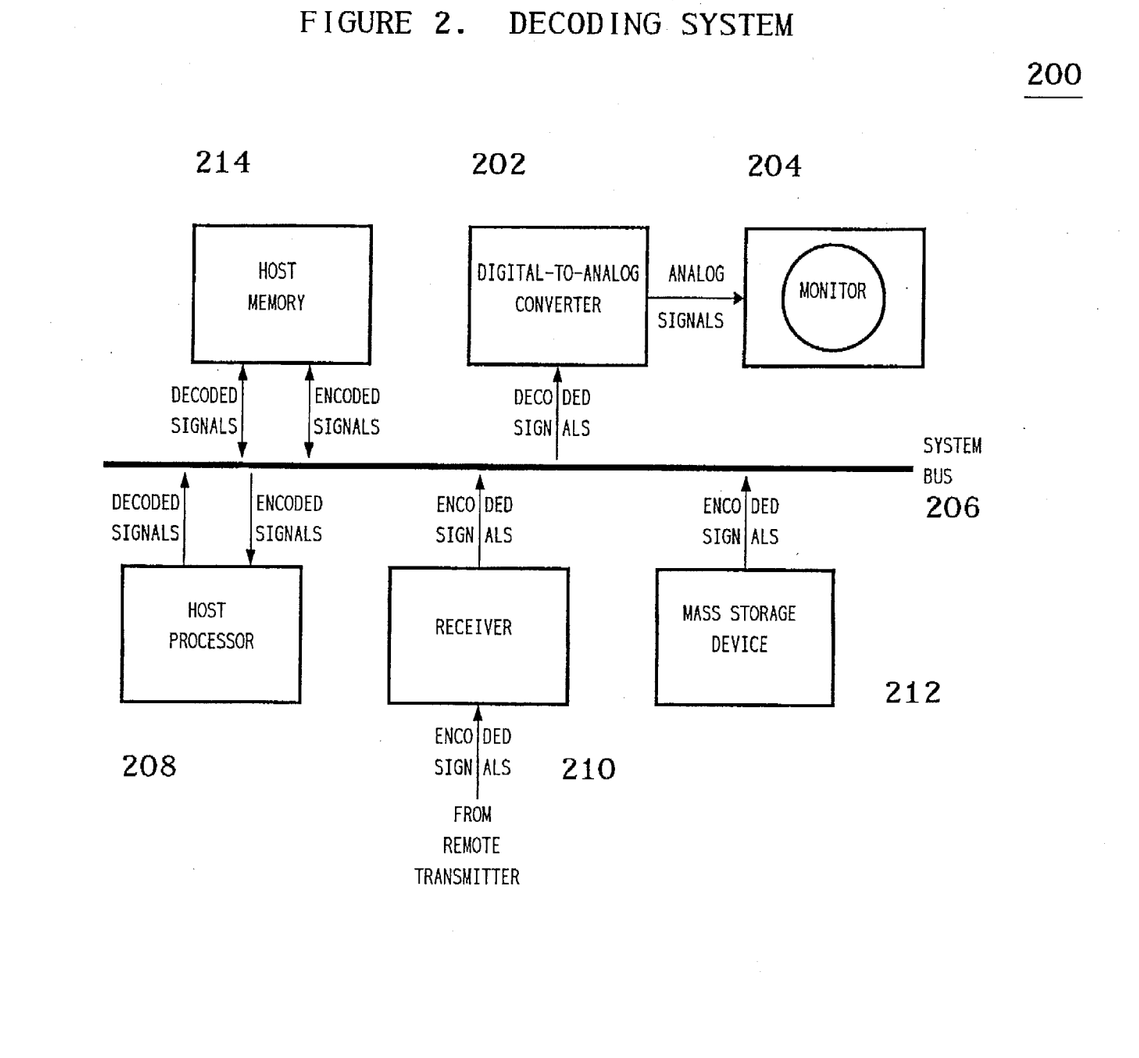
FIG. 2 is a computer-based decoding system for decoding the video signals encoded by the computer system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of video signals to monitor the encoding processing.

Figure 3:
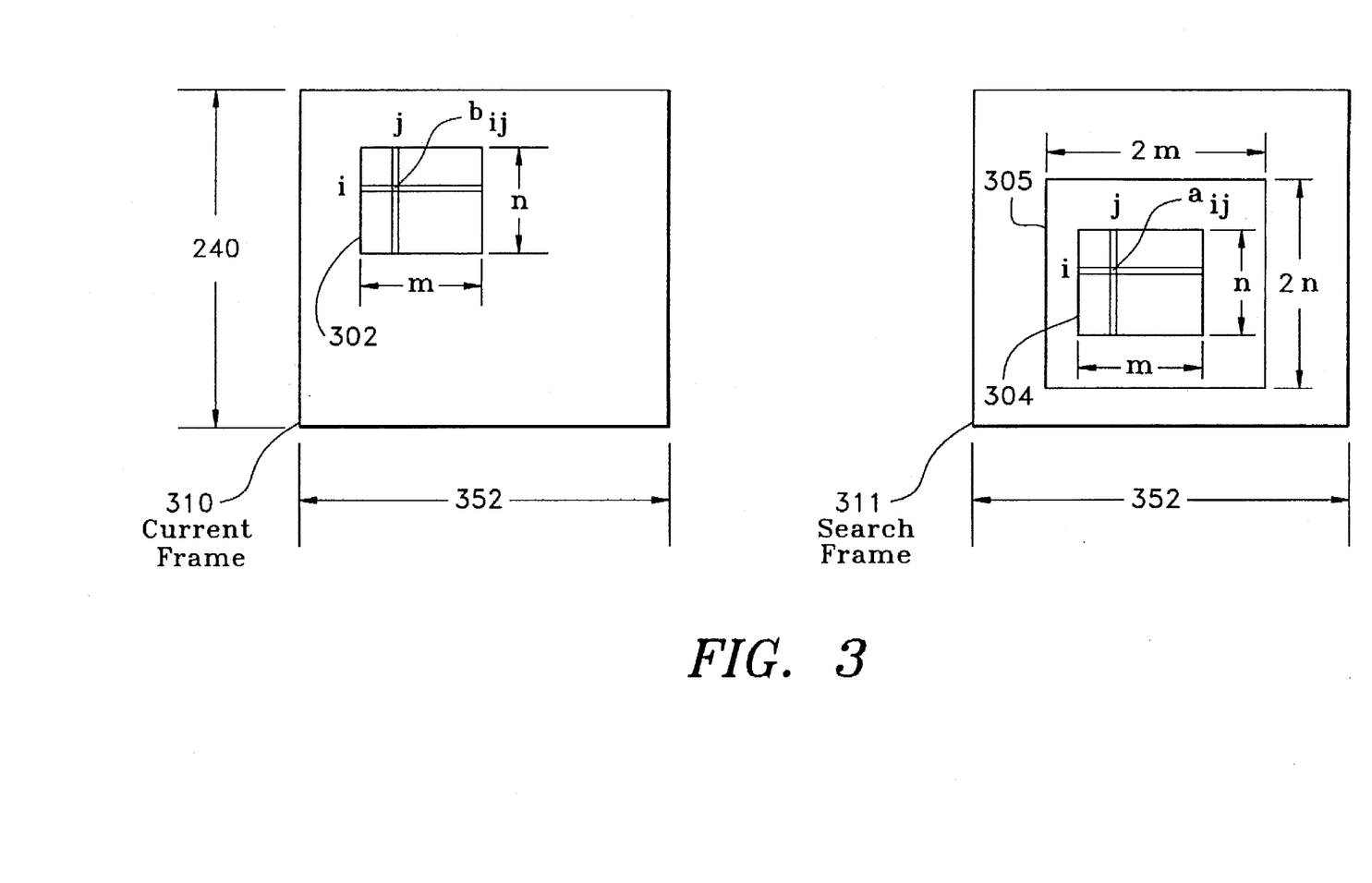
FIG. 3 depicts reference and search frames having reference and search blocks and a search area utilized in motion estimation by the computer system of FIG. 1, according to a preferred embodiment of the present invention.

Referring now to FIG. 3, there are shown current frame 310 and search frame 311 stored in memory device 112. Current frame 310 and search frame 311 are two of the most recent video frame frames of a plurality of consecutive video frames. Current frame 310 is the current video frame being compressed, and search frame 311 is a previous video frame, preferably the immediately previous video frame, which is searched by a motion estimation procedure for block matches between search frame 311 and current frame 310. Current frame 310 contains reference block 302, and search frame 311 contains search block 304 and search area 305.

Reference and search frames 310 and 311 may be of any pixel size, and in a preferred embodiment have a size of (240×352) pixels, i.e. 240 rows×352 columns of pixels. When performing block matching operations for motion estimation, current frame 310 is divided into a number of smaller regions or blocks such as reference block 302. Reference block 302 (as well as search blocks such as search block 304) may be of various sizes and shapes. In a preferred embodiment, reference block 302 contains an array of (8×8) pixels. In an alternative preferred embodiment of the present invention, reference block 302 contains a (16×16) block of pixels. In further alternative preferred embodiments, reference block 302 contains, in general, (n×m) pixels, where n is the number of rows and m is the number of columns.

When performing block matching for purposes of motion estimation, reference block 302 is compared with various search blocks such as search block 304 of search frame 311, and the afore-mentioned difference measurement which represents the overall difference between a reference block 302 and a given search block 304 is determined. If this difference value is sufficiently low, e.g. below a predetermined threshold value, a match is indicated. If a match is indicated, a motion vector which indicates the location of the matching search block 304 in search frame 311 as well as the location of reference block 302 in current frame 310, may be transmitted by pixel processor 106 to remote receiver 210. It will be appreciated that other data corresponding to current frame 310 may be transmitted as well, for example data compressed with other techniques that represent other blocks within current frame 310.

Since the decoding system of FIG. 2 should already have received previously-transmitted search frame 311 containing search block 304 (where search frame 311 may have itself been compressed and then decompressed), search block 304 from search frame 311 may be used with the transmitted motion vector to reproduce reference block 302 when decompressing current frame 310. It will be understood that if a lower threshold value is utilized in block matching, it will be more difficult to find a matching block, and the motion estimation procedure may take longer, but more accurate results may be obtained. By the same token, if a higher threshold value is utilized a match will likely be found more quickly but less accurate results may be obtained. It will further be understood that if no match is found during the motion estimation process then reference block 302 might not be able to be reconstructed from a similar block from the previous search frame 311, and may therefore need to be transmitted (for example, after being compressed by other data compression methods such as discrete fourier transforms).

Given two blocks such as reference block 302 and search block 304 which are to be compared with each other to determine if there is a match, a difference measurement is performed by encoding system 100. The basis of such measurement is often a calculation known as the L1 Norm, which has the following form:

$$L1\ Norm = \sum_{i=0}^{i=n} \sum_{j=0}^{j=m} |a_{ij} - b_{ij}|$$

where:

$a_{ij}$ is a pixel in the ith row and jth column of search block 304;

$b_{ij}$ is a pixel in the ith row and jth column of reference block 302;

n is the number of rows in a block; and m is the number of columns in a block.

It will be appreciated that the lower the difference indicated by the L1 Norm calculation, the more similar are the reference and search blocks being compared. It will further be appreciated that the likelihood of finding a match increases if more search blocks are compared against reference block 302, i.e. if more difference measurements are determined. For example, an exhaustive block matching comparison may be performed, where, for each reference block 302 within current frame 310, the L1 Norm difference measurement is calculated for every search block 304 within search frame 311, or at least until a match is found. It will be understood that the search blocks within search frame 311 may be displaced from each other by only one pixel horizontally or vertically and thus may overlap many neighboring search blocks by a substantial number of pixels. In such an exhaustive search, the first search block 304 may be chosen as the search block in the uppermost and leftmost corner of search frame 311, the next may be the search block one pixel displacement to the right of this block (which overlaps the previous search block to some extent), and so on until reference block 302 is exhaustively compared against each possible search block 304 within search frame 311.

Because such an exhaustive motion estimation procedure may be very computationally intensive, often the block matching performed by pixel processor 106 during the motion estimation procedure is performed on only a subset of possible search blocks within search frame 311. Because of the temporal correlation between successive video frames such as search frame 311 and current frame 310, it is often statistically likely that any potential matches that exist will be found within a local region surrounding the location of reference block 302, perhaps even at the same location as reference block 302. The reason for this is that image features often will not move by very many pixels, if at all, from frame to frame. Therefore, a search area such as search area 305 may be selected as a subset of search frame 311. However, it will be understood that search area 305 may be as large as search frame 311 itself. When, for example, an exhaustive block matching comparison is performed by comparing a reference block 302 to each search block 304 within search frame 311, search area 305 may be considered to be equal to the entire search frame 311. In a preferred embodiment, search area 305 is a proper subset of search frame 311 and any given search block 304 is selected from search area 305, thus yielding a smaller possible number of search blocks, and consequently a smaller number of L1 Norm difference measurements and related determinations and computations that must be performed. Those skilled in the art will appreciate that search area 305 may be in alternative preferred embodiments of any generalized size (p×q), to contain a selected number of search blocks 304.

Search area 305 may itself be searched exhaustively, as described above. However, even this number of block matching operations (i.e. difference measurement determinations) may be too computationally intensive, and other, more limited and/or more intelligent types of searches may be utilized instead of an exhaustive block matching procedure. Such "intelligent" searches are often called "hierarchical" or "stepping" searches since the next search block or blocks to be searched within search area 305 is dynamically selected as the search steps through search area 305.

For example, in a telescopic search, a search area 305 of size (2n×2m), i.e. (16×16), may be chosen for a given (8×8) reference block 302, where the location of reference block 302 may be selected as the center of search area 305. Thus, reference block 302 of current frame 310 will be matched against search blocks from search frame 311 displaced no more than four pixels horizontally and/or vertically from the location of reference block 302. The first search block 304 to be matched against reference block 302 may be a search block having the same spatial coordinates as reference block 302, i.e. in the center of search area 305. It will be understood that, in alternative preferred embodiments, the location of search block 304 as well as the placement of search area 305 may be selected depending upon the previously computed motion vector.

In a telescopic search, difference measurements are determined with respect to the initial search block and for search blocks displaced by one pixel to the left and one pixel to the right of the first search block. When these three difference measurements are computed, pixel processor 106 has access to difference measurements for three adjacent (and overlapping) search blocks, and pixel processor 106 may then decide to select further search blocks in a direction that appears likeliest to have a search block 304 that will match reference block 302. For many such stepping searches, an initial number of difference measurements are computed with respect to a certain cluster of adjacent or neighboring blocks, so that the stepping search can determine in which direction to perform the next difference measurement(s).

In the current invention, as described in further detail below, reference block 302 is matched against several search blocks in one step by taking advantage of computational redundancy as well as the physical memory layout of memory device 112. This yields several difference measurements which may be utilized regardless of the search method used. For example, if difference measurements are computed for several search blocks, the difference measurements for these search blocks do not need to be repeated if the search moves in the direction of these search blocks. Even if an exhaustive matching process is being utilized, more matches are done at a time.

Further, because more information is generated in one step, any stepping searches such as the telescopic search can make more informed decisions about the next group of search blocks that should be selected, and/or the initial difference measurements needed by the stepping search are performed more quickly and in one step. Thus, stepping searches are more likely to find a search block 304 that matches reference block 302 and in a smaller number of matching operations since the matching search block 304 will be zeroed in on more quickly and will be found more often than without the extra information. As further described below, minimal bus 108 bandwidth is also used by this method of motion estimation since fewer accesses to memory device 112 or even to local memory 130 need to be made by pixel processor 106 to perform a given number of block matching operations. In this manner, the present invention more efficiently utilizes bus access and bandwidth.

Figure 4A:
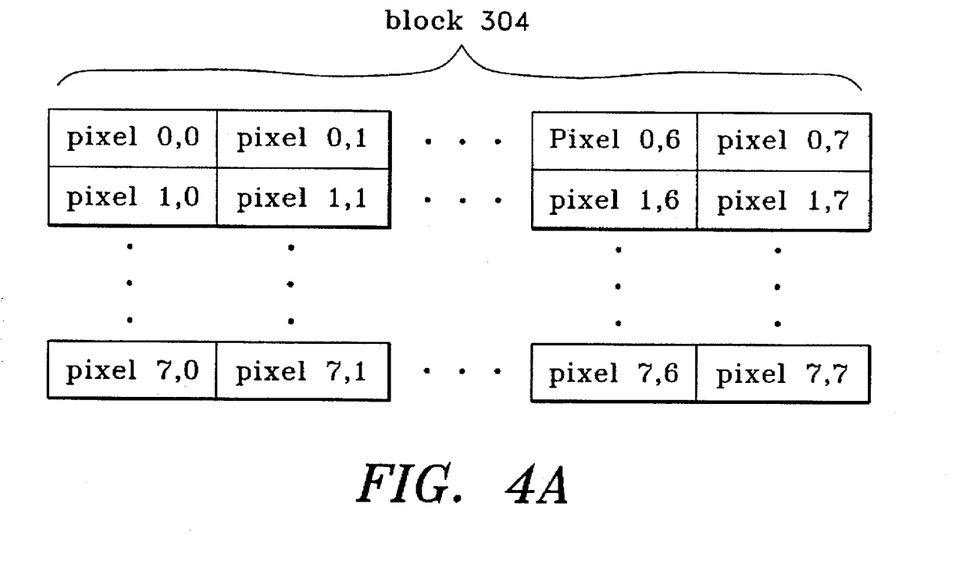
FIGS. 4A and 4B illustrate the ordering of pixels within the search block of FIG. 3, and the ordering of search blocks within the search frame of FIG. 3, respectively.
Figure 4B:
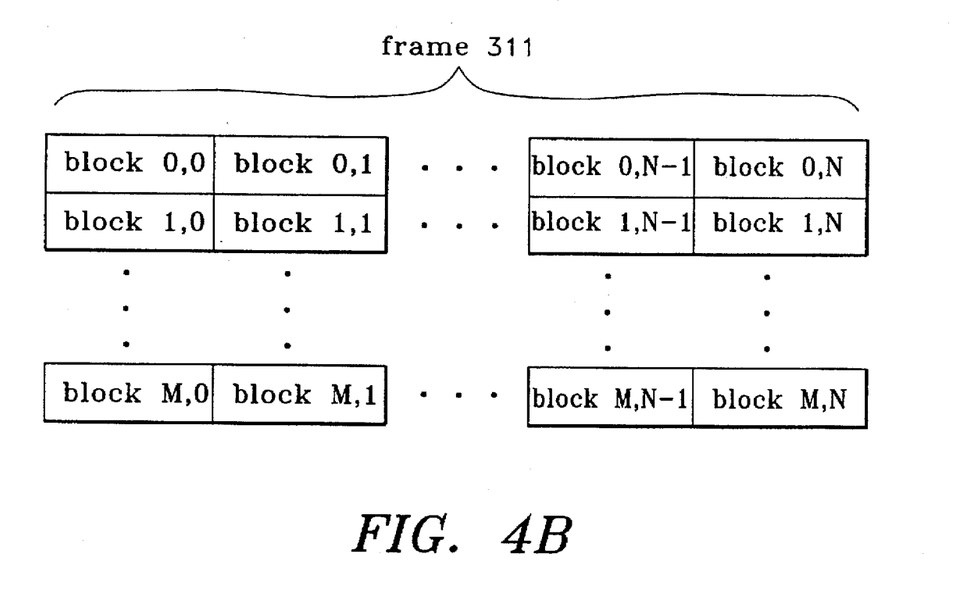

Referring now to FIGS. 4A and 4B, there is illustrated the ordering of pixels within search block 304 and the ordering of search blocks such as search block 304 within search frame 311. As shown in FIG. 4A, a given pixel i,j of an (8×8) search block 304 is located at the ith row and jth column of the block. Thus, pixel 0,0 is located in the upper left corner of search block 304 while pixel 0,7 is located in the upper right corner of search block 304. FIG. 4B shows the ordering of possible search blocks 304 within search frame 311, which are labelled in a manner similar to the pixels of FIG. 4A, where there are (M×N) search blocks within search frame 311.

Figure 5:
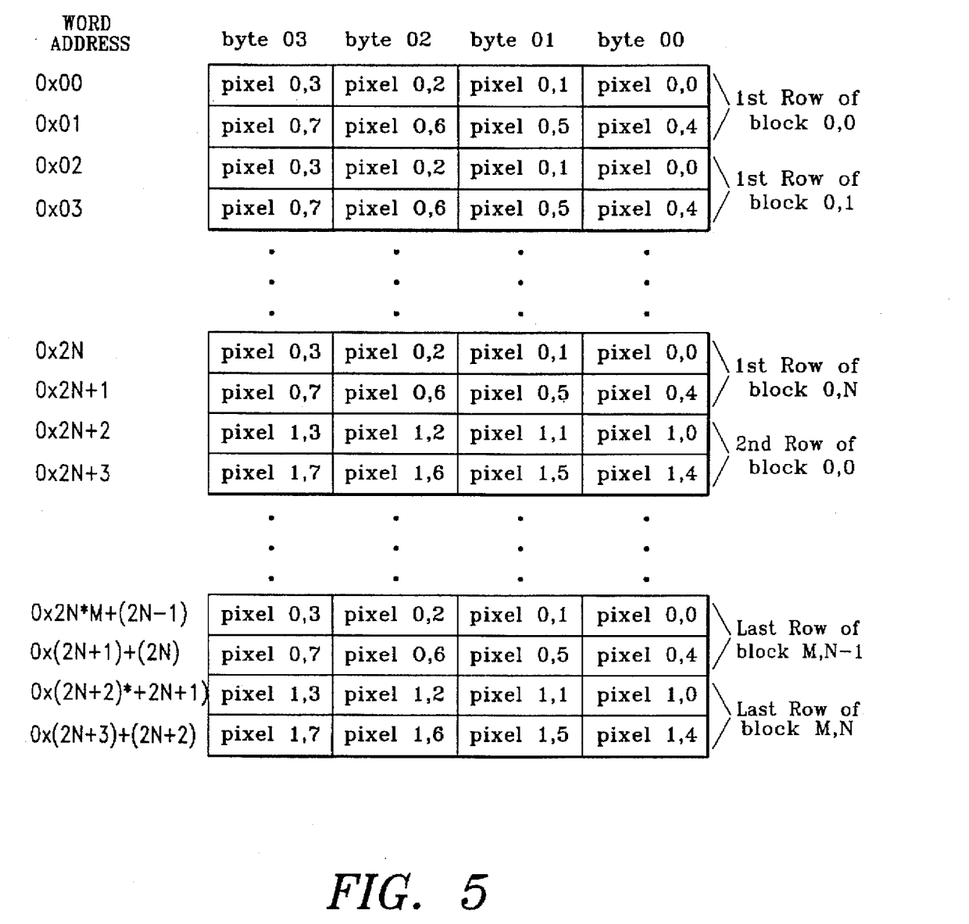
FIG. 5 illustrates the layout of search blocks within a memory device of FIG. 1.

Referring now to FIG. 5, there is shown the layout of blocks such as search block 304 in memory device 112. Typically, pixels are stored in external memory such as memory device 112 according to a scan order format. In this configuration, blocks of pixels are tiled across the entire image of search frame 311, forming a two-dimensional grouping of pixels as shown in FIG. 5. This ordering of pixels in memory impacts the way information read from memory device 112 is interpreted by pixel processor 106. The reason for this is that, as illustrated in FIG. 5, a block of pixels such as a search block 304 is not physically laid out as a contiguous group in memory device 112. Rather, all rows of each search block 304 that lie in a scan line of search frame 311 are stored adjacent to each other in memory device 112, as illustrated in FIG. 5.

Referring once more to FIG. 4A and 4B, each block comprises 8 rows of 8 pixels each. Referring again to FIG. 5, the first row of block 0,0, for example, lies within the first scan line of the image of search frame 311. Each pixel is an 8-bit (or single byte) pixel. Because each word of memory in memory device 112 is 32 bits (which is also the bandwidth of bus 108), each word contains four pixels, or half a row of a block. Thus, as shown in FIG. 5, the first two words of memory device 112 contain the 8 pixels of the first row of block 0,0, and the next two memory words contain the first row of block 0,1, and so on. The second row of block 0,0 is not reached in memory device 112 according to its word addresses until after the first row of block 0,N. It will be understood that the distance from one row to the next row in the same search block 304 will be equal to the horizontal pitch of the image stored in search frame 311.

Figure 6:
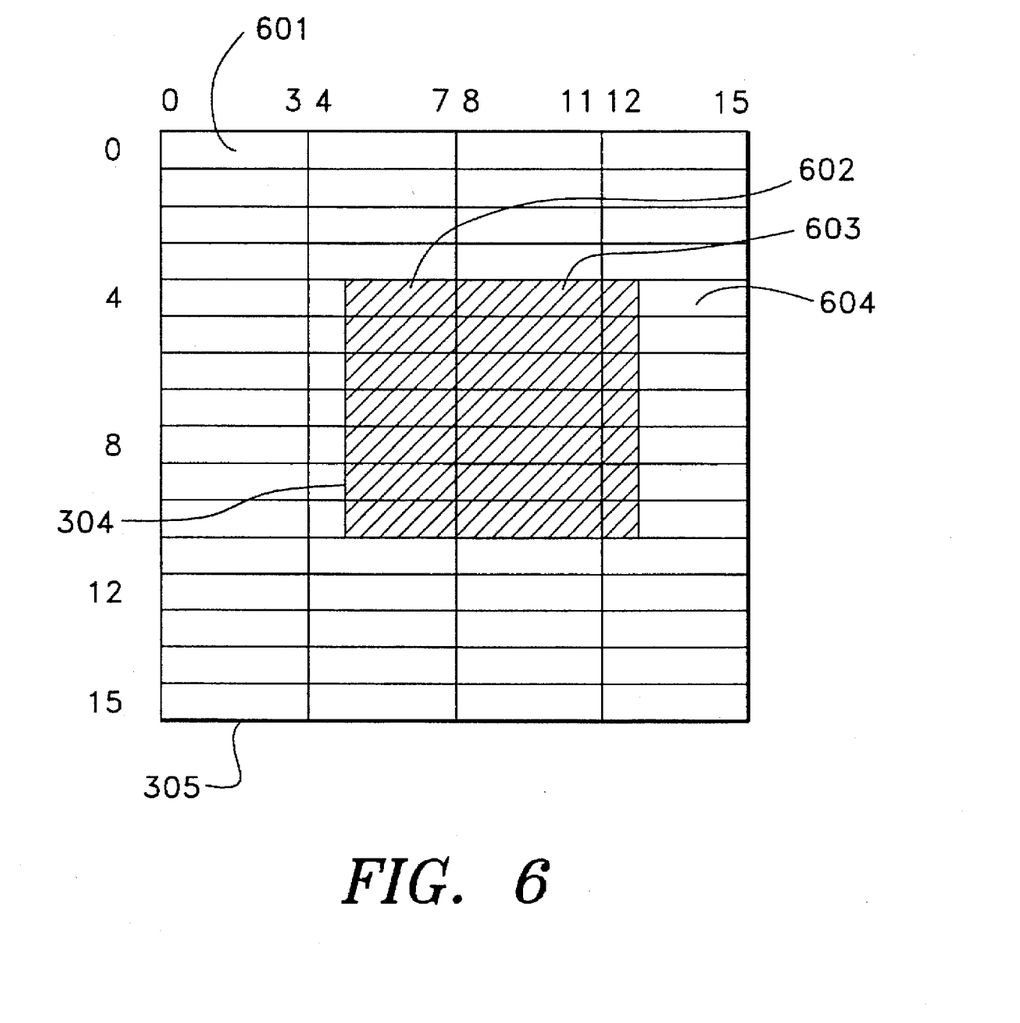
FIG. 6 depicts in more detail the search block and search area of FIG. 3.

Referring now to FIG. 6, search block 304 and search area 305 are depicted in further detail. As illustrated, search area 305 contains (16×16) pixels. These (16×16) pixels are stored in a (16×4) array of memory words, since each word of memory device 112 contains four pixels. For example, word 601 of search area 305 contains the pixels in row 0 and columns 0–3 of search area 305. If a first search block 304 is selected within search area 305 as illustrated in FIG. 6, the first row of search block 304 (i.e., row 4 of search area 305) contains 8 pixels or 2 words of pixels, but overlaps 3 words 602, 603, and 604 of search area 305.

Figure 7A:
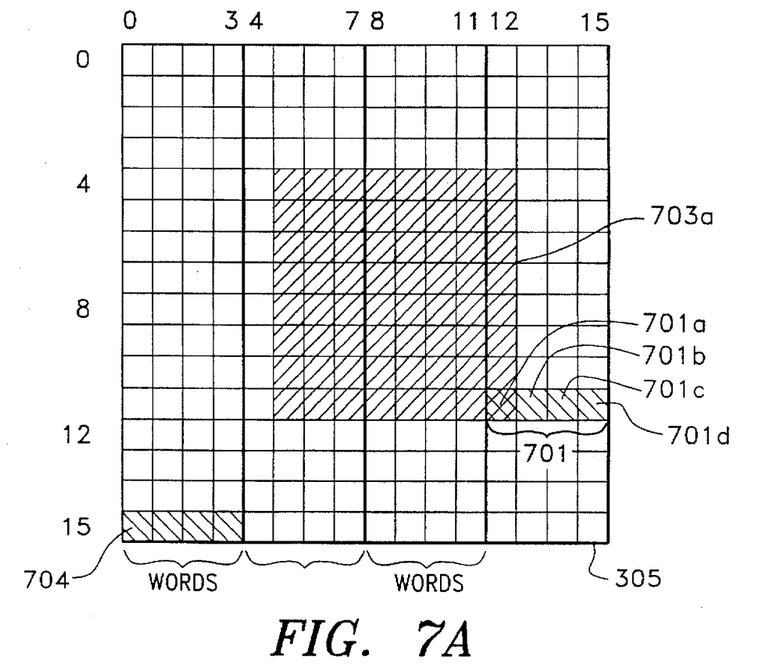
FIGS. 7A–D illustrate the displacement of four adjacent search blocks with respect to the search area of FIG. 3 during four block matching operations, according to a preferred embodiment of the present invention.

Referring now to FIGS. 7A–D, there is illustrated the displacement of four search blocks with respect to search area 305 during four block matching operations. FIG. 7A shows individual pixels of search area 305. As will be appreciated, memory words stored in memory device 112 each contain four pixels. For example, word 704 in the lower left corner of search area 305 contains pixels 15,0 through 15,3, as shown in FIG. 7A. Memory word 701 contains pixel 11,12 (pixel 701a), pixel 11,13 (pixel 701b), pixel 11,14 (pixel 701c), and pixel 11,15 (pixel 701d). As shown, search block 703a contains pixel 701a of word 701. Thus, to perform a difference measurement with respect to search block 703a, memory word 701 must be read from memory device 112.

Figure 7B:
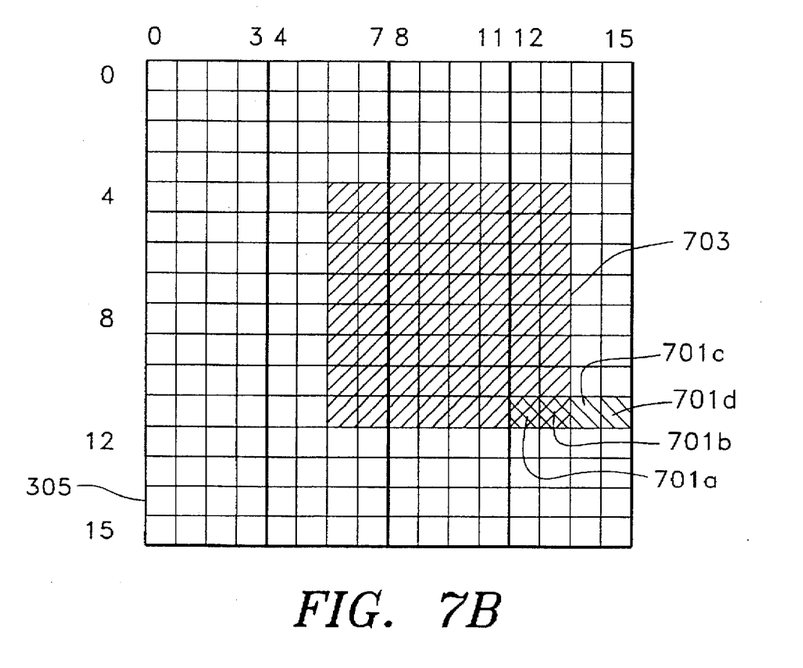
Figure 7C:
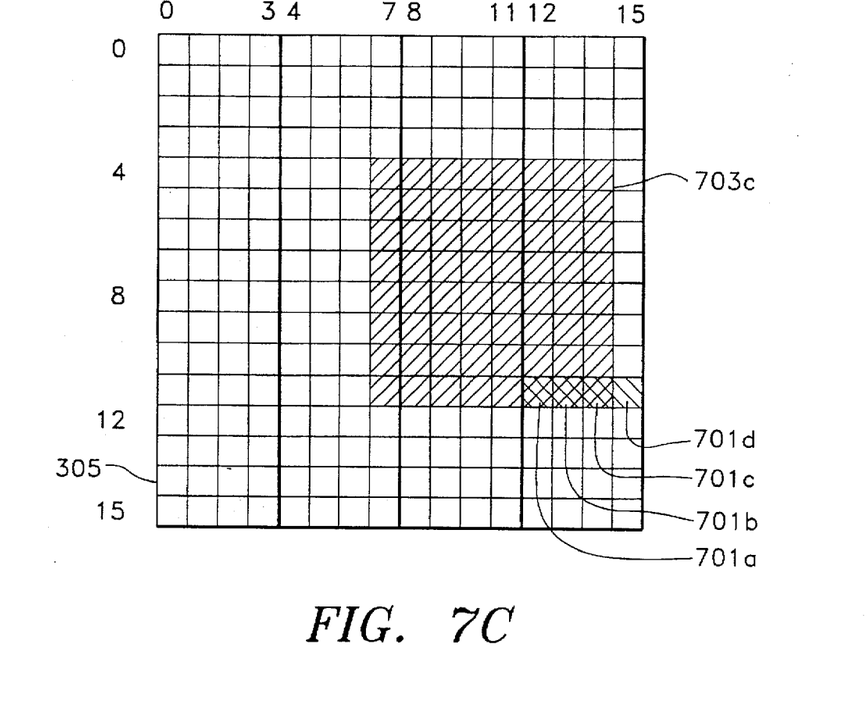
Figure 7D:
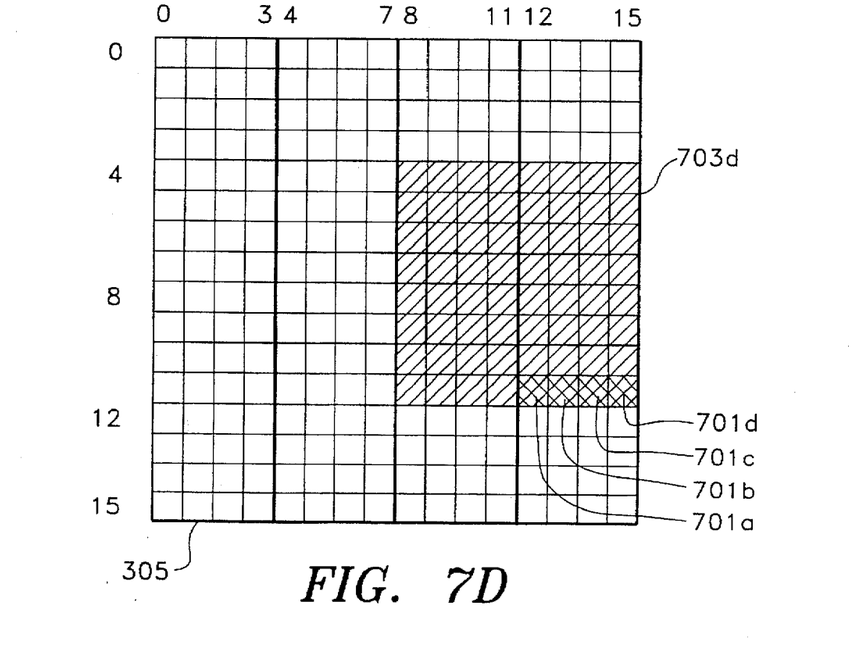

Search block 703b, which is displaced +1 pixels to the right from search block 703a, is illustrated in FIG. 7B. Similarly, search blocks 703c and 703d, displaced +2 and +3 pixels from search block 703a, are illustrated in FIGS. 7C and 7D, respectively. As shown in FIGS. 7A–D, each of the four search blocks 703a–d overlap memory word 701 and comprise one or more of the pixels 701a–d within word 701.

To perform an L1 Norm between reference block 302 and search block 703a, it will be understood that pixel 7,7 of reference block 302 is subtracted from the corresponding pixel 7,7 (i.e., pixel 701a) of search block 703a. Similarly, to perform L1 Norm difference measurements for displaced search blocks 703b–d, pixel 7,7 of reference block 302 is subtracted from pixel 701b, pixel 701c, and pixel 701d of search blocks 703b–d, respectively.

Thus, to perform four independent difference measurements between a reference block 302 and each of search blocks 703a–d, word 701 must be read from memory device 112 (or, alternatively, from local memory 130) four times, thus inefficiently utilizing bus 108. In the present invention, memory word 701 is read from memory device 112 a single time to perform block matching for all four search blocks 703a–d, and an Extended L1 Norm is performed that produces difference measurements for all four search blocks. The Extended L1 Norm performs all the calculations of the L1 Norm for a single reference block 302 with respect to each of search blocks 703a–d. For example, rather than computing the four subtractions mentioned above independently in four separate L1 Norm computations, in the Extended L1 Norm the four subtractions:

|Pixel 701a–Pixel 7,7|
|Pixel 701b–Pixel 7,7|
|Pixel 701c–Pixel 7,7| and
|Pixel 701d–Pixel 7,7| are performed together in a shorter total time than it takes to perform four such independent subtractions. For example, where the hardware architecture is typically 32 bits, an arithmetic logic unit ("ALU") may be configured to store at least two pairs of 8-bit operands simultaneously and perform a subtraction upon the two 8-bit number pairs in the same time that it would take to subtract a single 8-bit number pair. Further, because four 8-bit numbers, or bytes, may be stored in a single 32-bit word of memory, it is also possible to perform four subtractions in the time that a single 8-bit subtraction would take. Such processing may be referred to as "pseudo-SIMD" (where SIMD represents single-instruction, multiple-data parallel processing methods), an example of which is disclosed in U.S. patent application Ser. No. 08/182,758, filing date Jan. 14, 1994 abandoned in favor of File Wrapper Continuing Application Ser. No. 08/400,546, filing date Mar. 8, 1995, which issued on Oct. 15, 1996 as U.S. Pat. No. 5,566,250, the entirety of which is incorporated herein by reference. It is also known to utilize pipelining to subtract four numbers from the same operand in a shorter time than it takes to independently perform four subtractions.

For example, it is known that a single L1 Norm computation may typically require 16 cycles of clock time for an (8×8) search block. However, using hardware or software techniques as described above, the Extended L1 Norm described above may require only 30 cycles for simultaneously computing four difference measurements for the four adjacent search blocks as shown displaced in FIGS. 7A–D. This improvement in computational speed may be referred to as a computational advantage herein.

Further, without utilizing the method of the present invention, word 701 may need to be read four times to sequentially and independently determine difference measurements for search blocks 703a–d. Pixel processor 106 would require 4*16=64 cycles to perform the four difference measurements separately with the standard L1 Norm technique. Utilizing the motion estimation with efficient block matching in accordance with a preferred embodiment of the present invention, however, words such as word 701 need be read only once each. Although word 701 can conceivably be read once and retained by pixel processor 106 for use in four block matching procedures, this may require special pointers and other features that are not always desirable in a multi-purpose or more general purpose processing environment. It will be understood that this same observation is true even where word 701 is read only once from memory device 112 into local memory 130, because it may also be inefficient to access local memory 130 multiple times to read the same words used over again for the next difference measurement. This reduction in the number of memory accesses required for a given number of difference measurements may be referred to in this application as a memory accessing advantage.

Thus, using pipelining and parallel processing techniques four calculations such as the above-described subtractions may be performed in an Extended L1 Norm computation more efficiently than during four independent L1 Norm computations. Further, the memory words containing many of the pixels needed for the four difference measurements are already read from memory for each of the four adjacent search blocks. These facts can be exploited to increase the efficiency of motion estimation and to minimize memory accessing and bus traffic.

Accordingly, it will be understood that, as used in this application, the term "adjacent search blocks" refers to search blocks that displaced from each other by a given pixel increment in one or more directions, such that at least some of the pixels within some of the search blocks are stored within common memory words.

In a preferred embodiment of the present invention, pixel processor 106 reads the entire search area 305, along with reference block 302, into local memory 130. Although local memory 130 is typically not large enough to store an entire video frame, it can in some embodiments be large enough to store a search area. Words are then accessed by pixel processor 106 from local memory 130 to perform the multiple difference measurements, as described hereinabove, with respect to the all four search blocks 703a–d. In alternative preferred embodiments memory words sufficient to perform said multiple difference measurements are read by pixel processor 106 directly from memory device 112.

Considering now the possible search blocks located between the left and right boundaries of search area 305 and occupying rows 4 through 12 of search area 305, as illustrated in FIG. 7A, pixel processor 106 may be utilized to compute, for example, difference measurements for a search block 304 across the entire width of search area 305. If search block 304 begins with its left column overlapping the leftmost (i.e., 0th) column of search area 305, for example, it will be understood that several possible search blocks may be selected by displacing search block 304 one pixel at a time horizontally until the rightmost column of search block 304 overlaps the rightmost (i.e. 15th) column of search area 305. Rather than performing, for example, eight separate block matches for eight such displacements, which may include eight separate and redundant memory accesses to read the necessary memory words from memory device 112, pixel processor 106 of the current invention will perform only two block matching calculations, each of which will generate four difference measurements. The first multiple block matching procedure will generate difference measurements for the four blocks displaced +0, +1, +2, and +3 from the leftmost column of search area 305, while the second multiple block matching procedure will generate difference measurements for the next four blocks displaced +4, +5, +6, and +7.

As described above, these multiple difference measurements are performed more quickly and efficiently than eight separate difference measurements performed according to conventional methods. Further, because these two multiple block matching operations more efficiently use words read from memory device 130, the eight difference measurements generated by the two block matching operations require fewer accesses of memory device 130 than would be required for eight separate block matchings. In a preferred embodiment of the present invention, search area 305 and search block 304 are aligned with word boundaries, for example a search block 304 aligned with the leftmost column of search area 305, at the beginning of a multiple block matching (i.e. multiple difference measurement) step.

It will be understood that the above-described method of motion estimation performing efficient block matching (also sometimes referred to as "multiple block matching" or "multiple difference measurements" in this application) is independent of the actual type of motion estimation procedure being utilized. For example, whether the motion estimation process proceeds by exhaustively performing block matching, or by use of a hierarchical or stepping search such as a telescopic search, the present invention is useful because more block matches (i.e. difference measurements) are performed for a given amount of words read. Thus the computation speed of the motion estimation procedure itself is increased because the block matching process is accelerated. Further, the use of bus bandwidth and memory accesses are minimized since memory words are read fewer times on average to perform block matching on a given number of search blocks 304. An additional benefit of the present invention is that more difference measurements, and hence more information, is generated for each block matching computation, thus allowing any hierarchical searches to make more intelligent choices about the direction in which the search should proceed.

It will further be understood by those skilled in the art that depending on how words are laid out in memory, "adjacent" blocks upon which multiple block matchings are performed may be other than horizontally aligned. For example, pixel bytes may be contained in memory words within a memory device such that the four "adjacent" blocks may be displaced by pixel increments from one another in a vertical direction. In this case the pixel processor will read a group of memory words that contain pixel information which can be used to perform multiple difference measurement for search blocks that comprise pixels within those words.

Those skilled in the art will also appreciate that the present invention is not limited to blocks of size (8×8) and search areas of size (16×16). For example, alternative preferred embodiments of the present invention may perform four block matching operations in one step using a (16×16) search block and a (32×32) search area. With these parameters, a single L1 Norm computation may typically require, for example, 72 cycles of clock time for a (16×16) search block, but only 88 cycles for simultaneously computing all four difference measurements.

It will further be understood that the above-described method of performing multiple difference measurements yields four difference measurements primarily because of the 32-bit word size commonly used in video processing applications. With such a word size, any given word contains four pixels. If a search block is aligned such that it overlaps only one pixel of a four-pixel word, when the word is read for use with a block matching operation with that search block, the other three pixels are necessarily read from memory as well. If these three pixels are not also used to perform three more block matching operations with three more search blocks displaced one pixel at a time to cover the three extra pixels in that word, then they will be read repeatedly when the next three search blocks are to be matched against a reference block, thereby inefficiently utilizing the bus. This also uses the processor inefficiently because multiple computations can be performed in parallel or pipeline fashion more efficiently than sequential, independent computations. It will be understood, however, that in alternative preferred embodiments, more or less than four block matchings may be performed in one operation. It will further be understood that, if more than four difference measurements are desired to be performed with a 32-bit word size architecture, it may be preferable to perform multiple difference measurements that yield a number that is a multiple of four to maximize the use of information read from memory. Further, in different architecture computer systems such as a 64-bit architecture, one word may contain eight pixels rather than four pixels. In this case, as will be appreciated by those skilled in the art, it may be preferable to perform eight difference computations (or multiples of eight) at a time rather than four, although either more or less than eight difference measurements may be determined as well. It will be understood that such multiple block matching to provide more or less than four difference measurements may be obtained by appropriately extending the L1 Norm calculation to cover all search blocks for which difference measurements are to be performed.

It will be appreciated that calculations other than the L1 Norm may be utilized to perform difference measurements between reference and search blocks. For example, the L2 Norm has the following form:

$$L2\ Norm = \sum_{i=0}^{i=n} \sum_{j=0}^{j=m} |a_{ij} - b_{ij}|^2$$

When alternative difference measurement methods are used, such as the L2 Norm, the method of determining difference measurements can in alternative preferred embodiments also be extended to perform multiple difference measurements on adjacent search blocks.

It will also be appreciated that in an alternative preferred embodiment, subsampling may be utilized. In subsampling, only every other pixel (for example, either vertically or horizontally) is utilized to compute the difference measurements. For example, the L1 Norm as described above may be performed as described with the exception that the calculation is performed only for even values of i, or only for even values of j (or both for combined vertical and horizontal subsampling). It will be understood that this effectively creates sparser matrices involved in the L2 Norm calculation. It will be understood that the L1 Norm or other applicable difference measurement technique can be modified for subsampling by using, for example, a sparser matrix having fewer entries or by restricting i or j to even or odd values as described above.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for encoding image signals, comprising the steps of:

(a) selecting a plurality of search blocks of a search frame in accordance with the location of a reference block of a current frame, wherein the search blocks and the reference block each comprise a plurality of pixels;

(b) reading from a memory device a plurality of words corresponding to the plurality of search blocks, wherein: each word stores at least two pixels of the search frame; and each search block comprises at least one pixel corresponding to a first pixel stored in a word of the plurality of words the word also storing a second pixel corresponding to a pixel of at least one other search block of the plurality of search blocks; and (c) determining from the plurality of words and from the reference block a difference measurement for each search block of the plurality of search blocks with respect to the reference block.

2. The method of claim 1, further comprising the step of:

(d) reading the reference block from a second memory device.

3. The method of claim 2, wherein the memory device and the second memory device are the same memory device.

4. The method of claim 3, wherein the memory device is a local memory device for storing the reference block and the plurality of words.

5. The method of claim 4, further comprising the steps of:

(e) reading the reference block from a third memory device and storing the reference block in the local memory device; and (f) reading the plurality of words from a fourth memory device and storing the plurality of words in the local memory device;

wherein steps (e) and (f) precede step (d).

6. The method of claim 5, wherein the third memory device and the fourth memory device are the same memory device.

7. The method of claim 3, wherein:

the memory device is a local memory device for storing the reference block and a search area, wherein the search area comprises a second plurality of search blocks, wherein the second plurality of search blocks comprises the plurality of search blocks.

8. The method of claim 7, further comprising the steps of:

(e) reading the reference block from a third memory device and storing the reference block in the local memory device; and (f) reading a second plurality of words corresponding to the search area from a fourth memory device and storing the second plurality of words in the local memory device, wherein the second plurality of words comprises the plurality of words;

wherein steps (e) and (f) precede step (d).

9. The method of claim 8, wherein:

the search area comprises a (32×32) array of pixels; and the third memory device and the fourth memory device are the same memory device.

10. The method of claim 8, wherein:

the search area comprises a (16×16) array of pixels; and the third memory device and the fourth memory device are the same memory device.

11. The method of claim 10, wherein the reference block and the search blocks of the plurality of search blocks each comprises an (8×8) block of pixels.

12. The method of claim 11, wherein the plurality of search blocks comprises eight adjacent search blocks.

13. The method of claim 11, wherein the plurality of search blocks comprises four adjacent search blocks, wherein the four adjacent search blocks are successively displaced one pixel from each other.

14. The method of claim 13, wherein the determining of step (c) comprises the step of determining the difference measurement for each search block of the plurality of search blocks with respect to the reference block by performing the Extended L1 Norm calculation.

15. The method of claim 2, wherein the reference block and the search blocks of the plurality of search blocks each comprises an (8×8) block of pixels.

16. The method of claim 15, wherein the plurality of search blocks comprises four adjacent search blocks.

17. The method of claim 16, wherein the four adjacent search blocks are successively displaced one pixel from each other.

18. The method of claim 15, wherein the plurality of search blocks comprises eight adjacent search blocks.

19. The method of claim 2, wherein the determining of step (c) comprises the step of determining the difference measurement for each search block of the plurality of search blocks with respect to the reference block by performing the Extended L1 Norm calculation.

20. The method of claim 2, wherein the reference block and the search blocks of the plurality of search blocks each comprises a (16×16) block of pixels.

21. The method of claim 20, wherein the plurality of search blocks comprises four adjacent search blocks, wherein the four adjacent search blocks are successively displaced one pixel from each other.

22. The method of claim 20, wherein the plurality of search blocks comprises eight adjacent search blocks.

23. An apparatus for encoding image signals, comprising:
  (a) means for selecting a plurality of search blocks of a search frame in accordance with the location of a reference block of a current frame, wherein the search blocks and the reference block each comprise a plurality of pixels;
  (b) means for reading from a memory device a plurality of words corresponding to the plurality of search blocks, wherein; each word stores at least two pixels of the search frame; and each search block comprises at least one pixel corresponding to a first pixel stored in a word of the plurality of words, the word also storing a second pixel corresponding to a pixel of at least one other search block of the plurality of search blocks; and
  (c) means for determining from the plurality of words and from the reference block a difference measurement for each search block of the plurality of search blocks with respect to the reference block.

24. The apparatus of claim 23, further comprising:
  (d) means for reading the reference block from a second memory device.

25. The apparatus of claim 24, wherein the memory device and the second memory device are the same memory device.

26. The apparatus of claim 25, wherein the memory device is a local memory device for storing the reference block and the plurality of words.

27. The apparatus of claim 26, further comprising:
  (e) means for reading the reference block from a third memory device and for storing the reference block in the local memory device; and
  (f) means for reading the plurality of words from a fourth memory device and for storing the plurality of words in the local memory device;
  wherein the reading and storing of means (e) and (f) precede the reading of means (d).

28. The apparatus of claim 27, wherein the third memory device and the fourth memory device are the same memory device.

29. The apparatus of claim 25, wherein:
  the memory device is a local memory device for storing the reference block and a search area, wherein the search area comprises a second plurality of search blocks, wherein the second plurality of search blocks comprises the plurality of search blocks.

30. The apparatus of claim 29, further comprising:
  (e) means for reading the reference block from a third memory device and for storing the reference block in the local memory device; and
  (f) means for reading a second plurality of words corresponding to the search area from a fourth memory device and for storing the second plurality of words in the local memory device, wherein the second plurality of words comprises the plurality of words;
  wherein the reading and storing of means (e) and (f) precede the reading of means (d).

31. The apparatus of claim 30, wherein:
  the search area comprises a (32×32) array of pixels; and
  the third memory device and the fourth memory device are the same memory device.

32. The apparatus of claim 30, wherein:
  the search area comprises a (16×16) array of pixels; and
  the third memory device and the fourth memory device are the same memory device.

33. The apparatus of claim 32, wherein the reference block and the search blocks of the plurality of search blocks each comprises an (8×8) block of pixels.

34. The apparatus of claim 33, wherein the plurality of search blocks comprises eight adjacent search blocks.

35. The apparatus of claim 33, wherein the plurality of search blocks comprises four adjacent search blocks, wherein the four adjacent search blocks are successively displaced one pixel from each other.

36. The apparatus of claim 35, wherein the means (c) comprises means for determining the difference measurement for each search block of the plurality of search blocks with respect to the reference block by performing the Extended L1 Norm calculation.

37. The apparatus of claim 36, wherein the apparatus is electrically connected to a bus.

38. The apparatus of claim 24, wherein the reference block and the search blocks of the plurality of search blocks each comprises an (8×8) block of pixels.

39. The apparatus of claim 38, wherein the plurality of search blocks comprises four adjacent search blocks.

40. The apparatus of claim 39, wherein the four adjacent search blocks are successively displaced one pixel from each other.

41. The apparatus of claim 38, wherein the plurality of search blocks comprises eight adjacent search blocks.

42. The apparatus of claim 24, wherein means (c) comprises means for determining the difference measurement for each search block of the plurality of search blocks with respect to the reference block by performing the Extended L1 Norm calculation.

43. The apparatus of claim 24, wherein the reference block and the search blocks of the plurality of search blocks each comprises a (16×16) block of pixels.

44. The apparatus of claim 43, wherein the plurality of search blocks comprises four adjacent search blocks, wherein the four adjacent search blocks are successively displaced one pixel from each other.

45. The apparatus of claim 43, wherein the plurality of search blocks comprises eight adjacent search blocks.

\* \* \* \* \*